Oct. 5, 1965 R. R. PERRON 3,210,546
INFRARED SCANNING APPARATUS FOR FLOW DETECTION USING
DUPLICATE PARALLEL DETECTORS
Filed June 18, 1962 2 Sheets-Sheet 1

Robert R. Perron
*INVENTOR.*

BY
Attorney

Robert R. Perron
*INVENTOR.*

BY
Attorney

United States Patent Office 3,210,546
Patented Oct. 5, 1965

3,210,546
INFRARED SCANNING APPARATUS FOR FLOW
DETECTION USING DUPLICATE PARALLEL
DETECTORS
Robert R. Perron, Beverly, Mass., assignor to Arthur D.
Little, Inc., Cambridge, Mass., a corporation of
Massachusetts
Substituted for abandoned application Ser. No. 91,103,
Feb. 23, 1961. This application June 18, 1962, Ser.
No. 205,173
9 Claims. (Cl. 250—83.3)

This invention relates to a new type instrument and more particularly one designed for scanning a surface to determine and record characteristics of the surface.

In many manufacturing operations it is desirable to be able to automatically evaluate certain characteristics of an article without dismantling or otherwise taking it apart. For example, in constructing an insulating member it is desired to know whether or not the insulation is evenly distributed. If voids are present in the insulation, they will permit radiant flux to be transmitted across the insulation and create temperature differentials on the surface area of the insulating member. Such a surface may be scanned by an apparatus capable of detecting these temperature differentials over the surface. The apparatus of this invention scans a surface of the character described in a rapid and accurate manner.

Scanning devices designed to detect, and if desired to record, temperature differentials existing on a surface, are generally based on the use of single detectors which are moved with respect to the surface to be scanned in a predetermined pattern and in a repetitive fashion. Normally the continuous pattern is of a saw-tooth or zig-zag pattern configuration. By using a single detector scanning at practical linear rates, it is possible for the zigzag pattern to completely miss certain important areas where surface characteristics should be noted. If with this type of known detector the scan lines or pattern are squeezed together, then more time will be required to scan the surface provided the linear scan rate is not increased. However, this linear scan rate cannot be arbitrarily raised without a loss in the effective signal-to-noise ratio. This may be shown by pointing out that the relationship between observation time, $t$, and bandwidth, $\Delta f$, of an amplifier used to pick up signals to pass a signal is given as $$t \approx \frac{1}{\Delta f}$$

That is, observation time, $t$, is inversely proportioned to the bandwidth. Hence it may be seen that when observation time is reduced the amplifier bandwidth must be increased, which in turn reduces the effective signal-to-noise ratio. It may be seen that it would be desirable to develop a new scanning device which does not possess these inherent disadvantages.

It is therefore an object of this invention to provide a novel scanning device which is capable of more completely scanning a given surface than the apparatus now available without experiencing a loss in the capability of signal detection. It is another object of this invention to provide a scanning device of the character described which achieves the desired results without increasing the linear scan rate. It is yet another object to provide a scanning device which achieves these improved performance characteristics without requiring the increase of the bandwidth of the amplifier associated with the detector apparatus. It is another object to provide a method of accurately and more completely scanning a surface without sacrificing scanning speeds. These and other objects will become apparent in the following description of this invention.

The process and apparatus of this invention may be further described with reference to the following drawings in which FIG. 1 represents a scanning path of a typical prior art apparatus;

The scanning device of this invention may be shown to be comprised of duplicate parallel thermal detector means, focusing means to focus the detector means simultaneously on a surface to be scanned, transport means for exposing the detector means to thermal radiation along parallel paths of a predetermined pattern on the surface to be scanned, and means for measuring the response of the detector means to the radiant energy thereby transmitted to them from the surface.

A number of modifications will be shown to be possible in the apparatus without departing from the scope and spirit of the invention.

Figure 10:
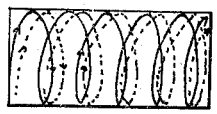
FIGS. 9 and 10 illustrate alternative scanning patterns.
Figure 9:
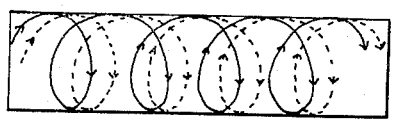

The method of scanning a surface to obtain a profile of thermal energy radiation from the surface may be seen to comprise the steps of focusing parallel and duplicate thermal detectors on a surface, moving the surface and the detectors with relation to each other in a manner to establish a scanning pattern of two parallel lines in a predetermined pattern on the surface, and continuously observing the response of the detectors to changes in the thermal energy radiated by the surface. A zigzag pattern is conveniently accomplished by moving the detectors vertically while moving the surface horizontally. Although the invention will be described in terms of using a zigzag pattern, it will be shown that other patterns such as illustrated in FIGS. 9 and 10 may be used. The detectors are made up of thermally sensitive devices and of optical means necessary for transmitting radiant flux from the surface to be analyzed to the thermally sensitive devices.

The apparatus of this invention achieves a more complete scanning of a surface in a given time without increasing the linear scan rate and without encountering the disadvantages inherent in such a rate increase. This is accomplished by using two detectors in a common optical scanning apparatus thus achieving an interlaced scanning pattern which makes possible the covering of twice the area without increasing the linear scan rate. Moreover, the area covered is more representative than was previously possible to obtain with single detection. This improvement in scanning may be illustrated with reference to FIGURES 1–4.

Figure 1:
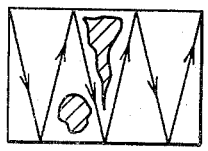

In FIGURE 1 a typical scanning pattern is illustrated by the lines having arrows which indicate the direction the scanning pattern takes. It can easily be seen from this figure that the two cross-hatched areas, one essentially a circular design and the other essentially a triangular design, can be completely missed by the scanning pattern of a typical scanner. It should be appreciated that the cross-hatched areas representing the missed portions of the surface are drawn merely for illustration and could take a number of other forms.

Figure 2:
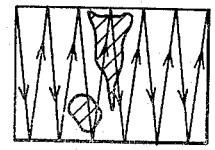
FIG. 2 represents a scanning path which results when the frequency of the pattern of FIG. 1 is doubled.

In FIGURE 2 there is shown the scanning pattern of a prior art apparatus when the frequency of the pattern has been doubled. As explained above, the linear rate or the scanning time must be doubled to obtain this pattern coverage. In this figure it will be seen that certain portions of the areas which were missed by the scanning of FIGURE 1 can now be identified, but with the disadvantages inherent in using this scanning pattern.

Figure 3:
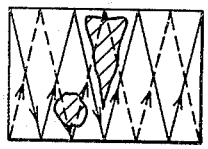
FIG. 3 shows a typical scanning path of the apparatus of this invention.

FIGURE 3 illustrates a typical scanning pattern for the apparatus of this invention. In this case by the use of duplicate parallel detectors, it is possible to scan over more of the surface without a corresponding sacrifice in scanning time or amplifier performance. The solid and dotted lines of FIGURE 3 represent the paths of the two detectors, respectively. It will be seen that although the paths of the patterns in FIGS. 2 and 3 each cross the shaded areas the same number of times the pattern of FIG. 3 gives a truer profile of the area than that of FIG. 2. Thus, by the process of this invention, it is possible to cover twice the area of the surface without increasing the linear scan rate and also to obtain a more characteristic overall profile of the surface.

Figure 4:
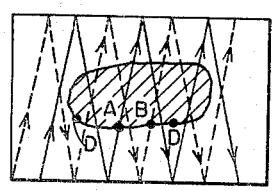
FIG. 4 illustrates a modified surface characteristic which may be encountered.
Figure 8:
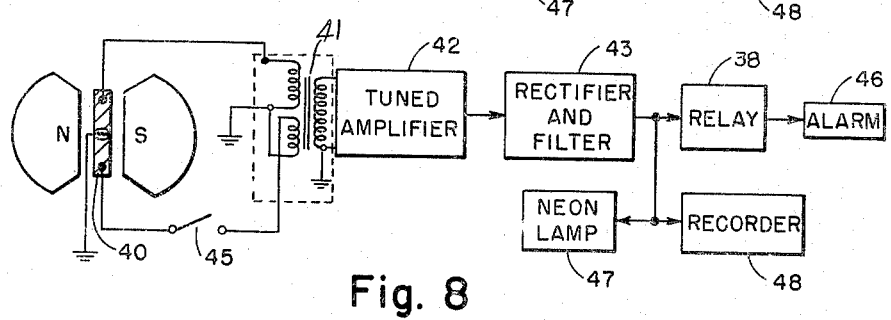
FIG. 8 is an alternate circuit which may be used in place of that of FIG. 7.

FIG. 4 illustrates another type of scanning problem which may be encountered in analyzing a surface. In this case, a temperature differential is observed only when entering and leaving the large area. The modification of the apparatus of this invention shown in FIG. 8 is designed to accurately analyze such a surface as discussed below with reference to FIG. 8.

Figure 5:
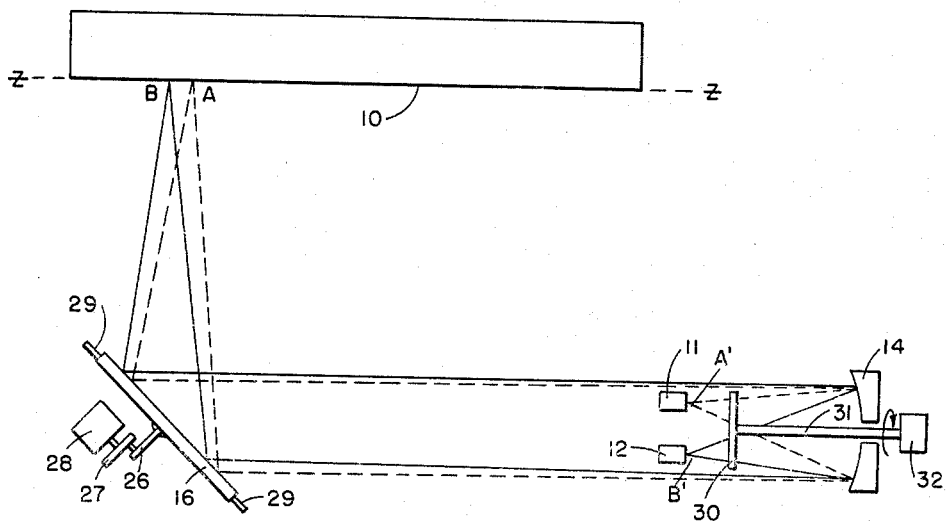
FIG. 5 is a top plan view of a surface and the scanning device of this invention.
Figure 6:
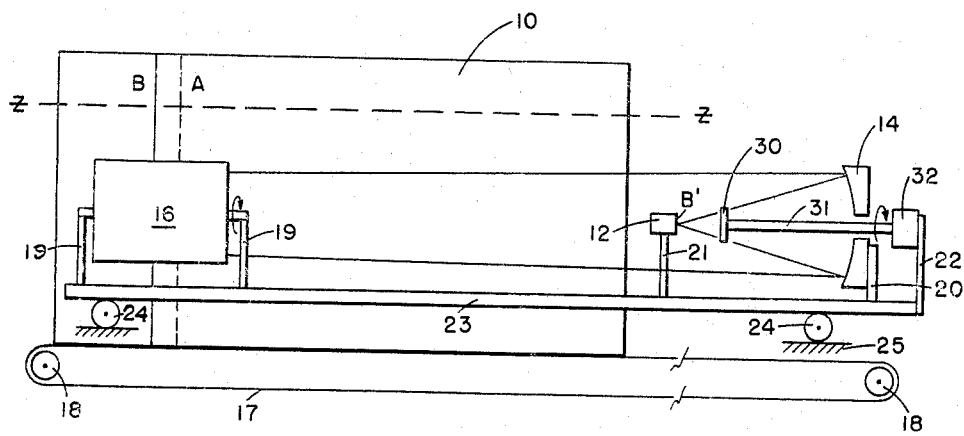
FIG. 6 is a side elevation of the surface and apparatus of FIG. 5.

Turning now to FIGS. 5 and 6, there are illustrated two views of a surface to be scanned and typical apparatus constructed in accordance with this invention.

Spots A and B on the surface 10 to be scanned are brought to focus by suitable optics to points A′ and B′ on the two thermal detectors 11 and 12, respectively. Any suitable optical arrangement which can accomplish this focusing may be used in conjunction with the actual detectors to make up the detecting means. FIGS. 5 and 6 illustrate, for example, the use of a parabolic mirror 14 and an oscillating plane mirror 16 for vertical scanning. The mirror 16 in its oscillating movement scans two parallel vertical lines A and B (FIG. 6) while the surface 10 may be moved along plane Z—Z, the result being two parallel zigzag scans as illustrated in FIG. 3. Alternatively, the entire detecting means may be moved while the surface remains stationary.

FIGS. 5 and 6 illustrate typical kinds of devices which may be used to realize the required zigzag scanning through movement of the surface, plane mirror and entire detecting means. It will be appreciated that any such devices or combinations of them may be employed for this purpose. In FIGS. 5 and 6 the apparatus for moving the surface in a horizontal plane comprises a conveyor belt 17 shown to be moved by suitable drive wheel 18. Such a conveyor means may be used, of course, to continuously move one surface after the other past the detecting means.

Likewise the detecting means (including the plane oscillating mirror 16, detectors 11 and 12 and parabolic mirror 14) may be mounted through the use of supports 19, 20 and 21 on a support plate 23 moving along tracks 25 by means of rollers 24.

The required oscillatory motion is imparted to plane mirror 16 by means of any suitable apparatus such as crank arm 26 and crank 27 driven by motor 28. The mirror is mounted through bearings 29 and through crank arm 26 and crank 27 is oscillated by motor 28 such that the areas being scanned on the object plane move up and down.

Because of the relation $1/f = 1/p + 1/q$ and $M = q/p$ where $f$ is the parabolic mirror focal length, $p$ is the object ditsance, $q$ is the image distance and $M$ is the magnification, it can be seen that the image size will usually be a reduction of the object. For example, for a focal length of 6 inches and an object distance of 80 inches the image is found to be 0.081×object size. Hence for an object size or a spread of 1½ inches between the two parallel scans, the images will be only 0.12 inch apart. This means that the detectors must be very small so that the center lines are separated by only 0.12 inch. It will be appreciated that this represents only an example of the focal length and objects which may be encountered in this invention and other optical equipment may be used to give other focal lengths and object sized.

The detectors 11 and 12 of FIG. 5 may be any suitable detectors which are capable of responding to very small changes of radiant energy. For example, those detectors 11 and 12 illustrated in FIG. 5 may be small individual bolometers or they may be a differential-type bolometer. As will be shown later in connection with the discussion of FIG. 8, these may be replaced with a device which is responsive to electromagnetic changes.

Figure 7:
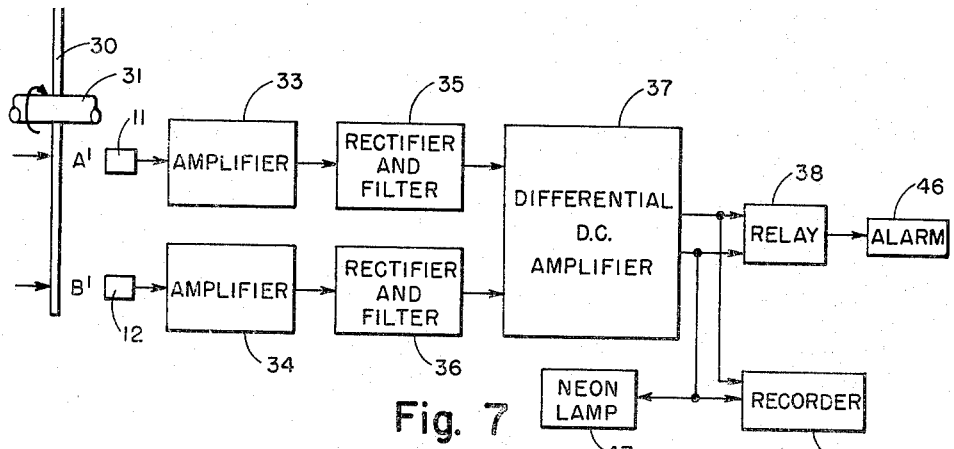
FIG. 7 is a diagram of the scanning circuit of this invention.

FIG. 7 illustrates the circuit which may be employed in conjunction with and completes the apparatus of this invention. In order to achieve the maximum efficiency of detection and relay of information and to use the most desirable form of a high gain amplifier, it is desirable to convert the radiant energy falling upon detectors 11 and 12 to an alternating signal. This is most conveniently done by the well known method of using a chopper 30, such as illustrated, which is rotated by a suitable shaft 31 operated from a small motor 32. This motor 32 is also mounted through support 22 to support plate 23. Signals received from detectors 11 and 12 are then introduced into parallel circuits which comprise high gain amplifiers 33 and 34 tuned to the frequency of chopper 30, and rectifiers and filters 35 and 36. The two signals may then be fed into a differential D.C. amplifier 37 which indicates to a relay 38 the difference in temperature of the signals picked up by detectors 11 and 12 by virtue of the temperature differentials existing on the surface 10.

FIG. 8 illustrates a modification of the circuit in which the two detectors are combined in a semiconductor detector 40. As an example of this type of detector may be cited the use of an indium antimonide film deposited on a substrate and placed in a magnetic field as illustrated by the presence of the north and south poles in FIG. 8. Current induced in the film is then introduced into a transformer 41 where the primary coils are in turn connected to a tuned amplifier 42. The remaining portion of the circuit then consists of a rectifier and filter 43 and a relay 44.

The addition of switch 45 makes it possible better to evaluate or analyze an area such as the hatched area in FIG. 4. It can be appreciated that where such a large area, in relation to the scanning pattern, of different temperature exists, the differential would be observed only when the scanning lines enter and leave the area. This means that at points such as A and B no differential would occur. By providing switch 45 (FIG. 8) it can be opened to cause the system to function with a single input. This then permits the investigation of an entire boundry such as DD.

The output from the apparatus may be used in several different ways to indicate temperature gradients on the surface and hence to show where imperfections in the insulation of a system, the surface of which is being examined, exist. First, if the instrument is not being continuously observed, the relay 38 (FIGS. 7 and 8) may be used to trigger an alarm 46 when a temperature transient is reached or crossed. Likewise, a neon lamp 47 in the circuit may be used to visually warn of the presence of a rapid transient. When these temperature transients or differentials are noted they may then be re-examined more slowly with blips being indicated and recorded on the recorder 48.

Scanning patterns other than the zigzag patterns described above may, of course, also be used. FIGS. 9 and 10 illustrate two other representative patterns. These may be termed prolate cycloids and are obtained when mirror 16 (FIG. 6) is given a circular motion by motor 28 and its auxiliary shafts and mirror mounting to give the scanning pattern of FIG. 9, or when the mirror motion describes an ellipse to give the scanning pattern of FIG. 10. The surface being scanned in each of these cases is, of course, being simultaneously moved along line Z—Z.

It is apparent from the above description of this invention that there is provided an improved method and apparatus for automatically scanning a surface across which temperature gradients may exist. The scanning achieved by this apparatus results in an accurate and rapid evaluation of the surface.

Modifications in the various elements of the apparatus will be apparent to those skilled in the art and such modifications are within the scope of this invention which is defined by the claims.

I claim:

1. Scanning apparatus for analyzing differentials in radiant flux emitted by a surface, comprising in combination
    (a) duplicate parallel detector means;
    (b) means for moving said surface and said duplicate parallel detector means with realtionship to each other whereby said duplicate detector means scan parallel continuous and systematic paths of a predetermined pattern across said surface; and
    (c) means for measuring the response of said detector means to said radiant flux emitted by said surface comprising
        (1) means for converting said radiant flux reaching said duplicate detector means to alternating current signals,
        (2) algebraic voltage summing means adapted to receive said alternating current signals and transmit a single signal proportional to the algebraic difference of said signals transmitted by said duplicate detector means, and
        (3) indicating means responsive to said single signal adapted to indicate a difference in radiant flux reaching said duplicate detector means.

2. Scanning apparatus for analyzing differentials in radiant flux emitted by a surface, comprising in combination
    (a) duplicate parallel detectors responsive to radiant flux incident thereon;
    (b) focusing means adapted to focus radiant flux emitted from said surface onto said detectors;
    (c) transport means for moving said detectors with said focusing means and said surface relative to each other whereby said detectors scan parallel predetermined patterns on said surface, and
    (d) means for measuring the response of said detector means to said radiant flux emitted by said surface comprising
        (1) means for converting said radiant flux reaching said duplicate detector means to alternating current signals,
        (2) algebraic voltage summing means adapted to receive said alternating current signals and transmit a single signal proportional to the algebraic difference of said signals transmitted by said duplicate detector means, and
        (3) indicating means responsive to said single signal adapted to indicate a difference in radiant flux reaching said duplicate detector means.

3. Apparatus in accordance with claim 2 wherein said duplicate detectors are two individual bolometers.

4. Apparatus in accordance with claim 2 wherein said duplicate detectors are a differential type bolometer.

5. Apparatus in accordance with claim 2 wherein said duplicate detectors are of the type which are responsive to electromagnetic changes.

6. Scanning apparatus for analyzing differentials in radiant flux emitted by a surface, comprising in combination
    (a) duplicate parallel detectors responsive to radiant flux incident thereon;
    (b) focusing means including a movable plane mirror and a parabolic mirror, said focusing means being adapted to focus said radiant flux from said surface to said detectors;
    (c) transport means for moving said detectors with said focusing means and said surface relative to each other;
    (d) means for imparting motion to said plane mirror whereby said transport means and said means for imparting motion cooperate to cause said detectors to scan parallel predetermined patterns on said surface;
    (e) chopper means associated with said detectors; and
    (f) means for measuring the response of said detectors to said radiant flux emitted by said surface.

7. Apparatus in accordance with claim 6 wherein said transport means comprises means for moving said surface in a horizontal plane.

8. Apparatus in accordance with claim 6 wherein said transport means comprises means for moving said focusing means and detectors in a horizontal plane and said means for imparting motion to said plane mirror comprises means for oscillating said mirror, thereby to expose said detectors to zigzag patterns.

9. Apparatus in accordance with claim 6 wherein said transport means comprises means for moving said focusing means and detectors in a horizontal plane and said means for imparting motion to said plane mirror comprises means for giving a circular motion to said mirror, thereby to expose said detectors to prolate cycloid patterns.

References Cited by the Examiner

UNITED STATES PATENTS

| | | | |
|---|---|---|---|
| 2,916,632 | 12/59 | Petterson | 250—219 |
| 2,949,055 | 8/60 | Blackstone | 88—1 |
| 2,967,211 | 1/61 | Blackstone | 88—1 |
| 2,975,293 | 3/61 | Kruse | 250—219 |
| 2,978,948 | 4/61 | Kimber | 88—1 |
| 3,033,991 | 5/62 | Sampson | 88—14 |
| 3,106,642 | 10/63 | Shapiro | 250—83.3 |

RALPH G. NILSON, *Primary Examiner.*